May 8, 1951  R. F. PIERCE  2,551,966
APPARATUS FOR AND METHOD OF TREATING FILM
Filed July 13, 1948
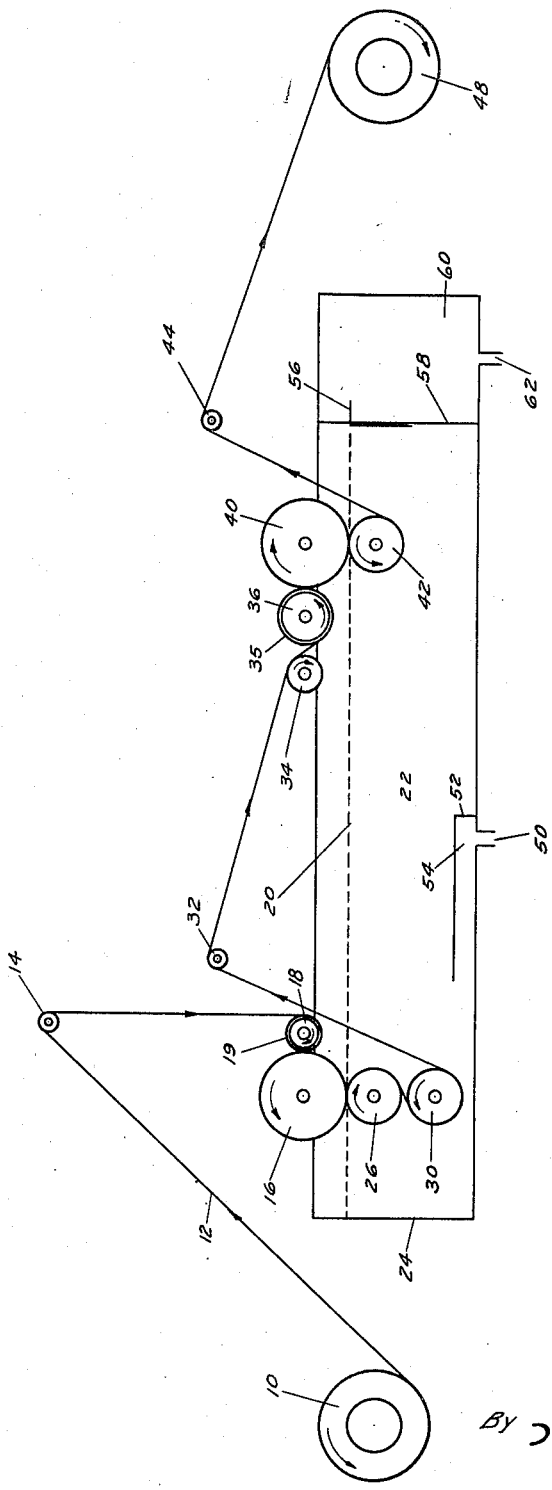
Inventor
Russell F. Pierce
By Harry H. Levine
Attorney Patented May 8, 1951

2,551,966

UNITED STATES PATENT OFFICE 2,551,966

APPARATUS FOR AND METHOD OF TREATING FILM

Russell F. Pierce, Terre Haute, Ind., assignor to The Visking Corporation, Chicago, Ill., a corporation of Virginia Application July 13, 1948, Serial No. 38,508

11 Claims. (Cl. 18—1)

This invention relates to an apparatus for and method of treating thermoplastic film. More particularly, it relates to a new and improved apparatus for and method of polishing the surfaces of polyethylene film as well as improving the clarity thereof.

United States Patent Nos. 2,153,533, 2,188,456 and 2,200,429 disclose a solid polymer consisting of polymerized ethylene and known as "polyethylene" or "polythene." Recently, there has been devised a process wherein polyethylene is extruded from a melt to form a thin wall seamless tubing which is collected in a flattened state on a reel. When sheeting is desired, the flattened tubing, prior or subsequently to winding on the reel, is longitudinally severed adjacent one or both of its longitudinal edges. Sheeting in the form of continuous film is also produced by extrusion of a melt through an appropriately shaped slot.

Polyethylene film is tasteless, odorless, thermoplastic, chemically inert, tough, flexible, retains its flexibility over a wide range of temperatures, waterproof, has a relatively low moisture vapor transmission, non-toxic, and not susceptible to humidity changes. Because of the afore-mentioned properties, polyethylene film is admirably suitable for numerous uses.

Polyethylene film, produced as above, is characterized by a hazy or cloudy appearance. The field of use of polyethylene film would be substantially increased if the clarity thereof were improved, and accordingly, many attempts have been made to improve the clarity of such polyethylene film.

An object of this invention is to provide an apparatus for and method of improving the physical characteristics of thermoplastic film.

Another object of this invention is to provide an apparatus for and method of improving the surface sheen of thermoplastic film.

A further object of this invention is to provide an apparatus for and method of improving the clarity of polyethylene film.

Other and additional objects will become apparent hereinafter.

The objects of the invention are accomplished, in general, by continuously laying successive portions of a continuous thermoplastic film on a substantially optically smooth peripheral surface of a continuously rotating heated drum and maintaining said successive portions in contact with said surface until at least the surface of said film in contact with said drum has softened, at which time the film is stripped from said drum. The stripping of the film from the heated drum is accomplished as the film is being cooled on both sides thereof. In one form of the invention, a chilling liquid is applied to the exposed surface of the film on the drum and also between the heated drum and the surface of the film in contact therewith at the place of stripping. After stripping, the film is immediately passed into a bath of the chilling liquid.

The successive portions of the film are laid in intimate contact on the substantially optically smooth surface of the continuously rotating heated drum. In one embodiment, the film is laid onto the rotating drum by means of a resilient surfaced squeeze roll disposed tangentially to the rotating heated drum at the point of application of the film onto the roll whereby entrapping of air between the film and the drum surface is prevented.

The apparatus for carrying out the above method comprises a continuously rotating heated drum having a substantially optically smooth peripheral surface and disposed so that its lowermost point, where stripping of the film from the drum is effected, is substantially tangent to the top surface of a chilling bath in a tank. The stripping of the film from the heated drum is effected by a stripping roll disposed in the chilling liquid with its uppermost point substantially tangent to the lowermost point of the heated drum and to the level of the chilling liquid. As a result of this arrangement, the chilling liquid will enter in the nips between the heated roll and the stripper roll. On the entering side the chilling liquid will contact the exposed surface of the film on the drum, while on the opposite nip it will enter between the film and the roll surface at the stripping point.

Means are provided to treat the opposite surface of the film in the manner previously described. In one embodiment, the film, after being stripped from the heated drum, is reversed and the untreated side subjected to a treatment on a second heated roll such as previously described.

The apparatus and method can be used separately for the treatment of preformed film wound on reels or in combination with the apparatus producing the film.

The method of this invention produces a film of improved physical characteristics. It renders the surface of the film brilliant and glossy and if the untreated film were hazy, improves the clarity of the film. It improves the elongation, tear strength, and tensile strength at low temperatures as well as decreasing the moisture vapor transmission.

The nature of the invention and the manner in which it may be practiced will become clear from the following detailed description when taken in conjunction with the accompanying drawings forming a part of this specification, and wherein the single figure of the drawings illustrates a vertical section of one embodiment of the apparatus.

Referring now to the drawings wherein like reference numerals designate like parts, the reference numeral 10 designates a roll of polyethylene film 12 which is to be treated. The film 12 is unwound from the roll 10, and after passing over a guide roll 14, is laid directly on a continuously rotating heated drum 16 with one side thereof in contact with said drum and the opposite side freely exposed. In order to prevent trapping of air between the surface of the drum and the film laid thereon, the film is laid on the drum by a squeeze roll 18 having a resilient surface 19. As shown in the drawings, the squeeze roll 18 is positioned tangentially to the heated drum 16.

The heated drum 16 is disposed so that the level 20 of a chilling liquid 22 in tank 24 is substantially tangent thereto at its lowermost portion which constitutes the place at which the film is stripped therefrom. It is to be noted that the squeeze roll 18 is located above and in spaced relationship to the top level 20 of the chilling bath 22.

The film 12 is stripped from heated drum 16 by a stripping roll 26 disposed in the tank 24 so that its uppermost point is tangent to the lowermost point of the heated drum 16. By virtue of this arrangement, the upper level 20 of the chilling liquid 22 is substantially tangent to the uppermost part of the stripper roll 26. Due to the arrangement of the heated drum 16 and the stripper roll 26, the chilling liquid 22 will enter into both of the nips formed by the drum 16 and roll 26. In the entering nip the chilling liquid will contact the exposed surface of the film in contact with the drum and in the opposite nip will enter between the surface of the film 12 and the heated drum 16. In other words, both surfaces of the film are chilled at the point of stripping. The chilling of the surface of the film in contact with drum 16 is important, since if the film is carried to a point above the level of the chilling liquid, it cannot be stripped off the drum surface without undesirable permanent distortions.

From the stripper roll 26 the film 12 is passed around a guide roll 30 disposed in the chilling liquid 22, and thence around another guide roll 32 positioned above the level of the chilling liquid 22. From guide roll 32 the film 12 is passed over guide roll 34 and thence under the resilient surface 35 of squeeze roll 36 which lays film 12 in intimate contact on heated drum 40. Both rolls 34 and 36 are located above the level of the chilling liquid in tank 24. The heated drum 40 is disposed relative to the water level 20 and a stripper roll 42 in the same manner as roll 16 is positioned relative to the water level 20 and the stripper roll 26.

Guide rolls 30, 32, 34 and squeeze rolls 18 and 36 are arranged so that film 12 in passing from stripper roll 26 to heated drum 40 is reversed whereby the surface of the film which was not in contact with drum 16 is disposed in contact with roll 40. After passing around stripper roll 42, film 12, which has now been treated on both sides, is withdrawn from the chilling bath and then passed over guide roll 44 and finally to windup roll 48.

The chilling liquid is continuously introduced through an inlet 50 in the bottom of the tank 24. To avoid currents a distributor 52 is provided to cooperate with the liquid inlet 50. In the form shown, the distributor 52 is an inverted pan provided with an outlet 54 whereby the chilling fluid will be caused to travel in the direction toward the left as viewed in the drawings.

The level 20 of the chilling liquid is maintained at the desired height by an adjustable weir gate 56 mounted on a partition 58 disposed in the tank. The overflow is received in compartment 60 of the tank from which it passes by means of an outlet 62.

The drums 16 and 40 are heated in any convenient manner and each is provided with means to control the temperature thereof. The heated drums 16 and 40 are provided with peripheral wall surfaces which are substantially optically smooth. Any material which can be fabricated into a cylinder or secured onto a cylinder and polished to substantially optical smoothness and not affected by thermal shock or contact with the cooling liquid can be used. Of course, an extremely hard surface on the roll would be advantageous in decreasing the possibility of damage to the roll surface. Though highly polished chrome-plated steel drums have been used, drums made of, or surfaced with various other materials, such as, for example, stainless steel, Stellite, X-alloy 306, nickel, Monel, brass, bronze, Pyrex, Herculite, etc., and polished to substantially optical smoothness can be used.

The resilient surfaces 19 and 35 of squeeze rolls 18 and 36, respectively, in general are formed of any resilient material which is not affected by the heat of the drum and does not interfere with the laying of the film on the respective drums. The precise composition of the resilient surface depends on the thermoplastic constituting the film being treated. With polyethylene film, the resilient surfaces can be formed of rubber, neoprene, Silastic (silicone).

The squeeze rolls 18 and 36 are preferably coextensive with the respective heated drums and mounted in bearings adjustable laterally to the drums 16 and 40, respectively. If desired, each of the squeeze rolls 18 and 36 may also be resiliently mounted in any well known manner. Optionally, each squeeze roll may be chilled by passing therethrough an appropriate chilling liquid.

Each stripper roll is coextensive with the respective heated drum. The diameter of the stripper roll can vary within wide limits. Preferably, the diameter of the stripper rolls should be less than that of the respective heated drum and sufficient to impart a sharp angular change of direction of the film stripped from the drum.

Any liquid medium which does not deleteriously affect the film and will set the film can be used. The temperature of the chilling liquid should be such as to quickly convert the heat-softened film to the hard solidified state and depends on the heat transfer properties of the liquid as well as the temperature to which the film has been heated in the process. In treating polyethylene film, water supplied at room temperature constituted a satisfactory medium and is preferred.

The heated drums 16 and 40, the squeeze rolls 18 and 36 and all the guide rolls, as well as the windup roll, may be positively driven at the same peripheral speed, although it has been found advantageous under some conditions to drive drum 40 at a slightly higher surface speed than drum 16. However, it has been found that only the heated drums 16 and 40 and the windup roll 48 need be positively driven and such operation is preferred. The windup roll 48 is provided with a device of the known type and construction for compensating its peripheral speed as its diameter builds up during the operation of the process.

The surface temperature of the heated drums depends on the thermoplastic constituting the film. In general, the temperature of the heated drum surface is such as will soften the thermoplastic without rendering it too fluid to strip satisfactorily from the drum surface. The optimum temperature for each type of thermoplastic film can be determined by simple experiment.

The peripheral speeds of the heated drums 16 and 40 and the windup roll 48 depend on the period of contact of the film on the respective heated drums, and this in turn depends on the thickness of the film treated. In carrying out the process, it is essential that the surface of the film in intimate contact with the heated drum be maintained in such position until the contact surface is softened so that it will intimately conform to the surface of the drum on which it is disposed prior to stripping of the film from the drum. The softening action of the film need not be restricted to the surface of the film in contact with the heated drum. The process is equally applicable to film softened throughout. The size and peripheral speed of the drums, however, should in no case be such as will cause splashing of the chilling liquid during operation.

In the case of polyethylene film, when drums $5\frac{7}{16}$ inches in diameter constituted the heated drums, the optimum temperature of the drum surfaces was found to be within the range of approximately 218° F. and approximately 228° F., and when the film was maintained in contact with the drums for approximately 2.8 seconds to 7.8 seconds, satisfactory results were obtained. At a temperature below 218° F. the film was not adequately polished and at a temperature about 228° F. it became too fluid to strip satisfactorily from the drum surface. Herein the temperatures of the drum surfaces were ascertained with a surface pyrometer.

In the event the chilling liquid upon evaporation from the heated drums leaves a residue, any appropriate means such as a rotating wiper or brush to continually clean and polish the drum surface may be provided intermediate its emergence from the chilling bath and the point where the film is laid on its surface.

The length of the drums should be preferably larger than the width of the film treated and the diameter may vary within wide limits. In no case should the peripheral speed of the drums be such as will cause any substantial splashing or spraying of the chilling liquid.

The location of the squeeze rolls relative to the heated drum depends on the period of contact between the drum and the film in contact therewith.

Though in the drawings the film is shown as being withdrawn from the chilling bath at an inclination thereto, it is to be understood that the invention is not restricted thereto. The film can be withdrawn from the chilling bath in a path perpendicular thereto. This arrangement can be obtained by providing additional guide rolls in the bath and is particularly suitable when droplets of the chilling bath adhere to the film. When the film passes from the chilling bath in a perpendicular direction, the droplets, due to gravity, have a tendency to drop off the film.

It is not necessary that a single chilling bath be used with both heated drums. If desired, each heated drum and the elements appurtenant thereto can cooperate with an individual and separate chilling bath. When separate chilling baths are used, each will be supplied with means for continuously supplying the chilling liquid as well as means for maintaining the level thereof.

In order to carry out the process it is not necessary to externally circulate or continuously supply the chilling liquid as previously described. The chilling liquid can be contained in an appropriate tank equipped with cooling means such as a cooling coil through which an appropriate chilling agent is circulated. Means of the known type may be provided to regulate the flow of the chilling agent through the coils in accordance with the temperature of the chilling bath whereby the temperature of the chilling bath will be controlled.

Though the invention has been described specifically in connection with polyethylene film, it is to be understod that it is not restricted thereto and is equally applicable to film formed of any thermoplastic material or composition.

This invention provides an apparatus for and method of treating thermoplastic film to improve the surface characteristics and also the clarity thereof. The invention can be utilized for treating one and, preferably, both sides of a film. It can be used in combination with a film-producing apparatus whereby the film produced can be treated in an operation continuous with the production thereof. The apparatus is relatively simple in construction and easy to operate to carry out the method.

Since it is obvious that various changes and modifications can be made in the above description without departing from the nature or spirit thereof, this invention is not restricted thereto except as set forth in the appended claims.

I claim:

1. A method of improving the physical characteristics of thermoplastic film which comprises disposing a thermoplastic film with one side thereof in intimate contact with a heated smooth surface, maintaining said film on said heated surface until at least the contact surface of said film softens, applying a chilling liquid to both sides of said film at the place where the film is to be stripped from said surface, and stripping said film from said surface.

2. A method of improving the physical characteristics of thermoplastic film which comprises disposing a thermoplastic film with one side thereof in intimate contact with a heated smooth surface, maintaining said film on said heated surface until at least the contact surface of said film softens, applying a chilling liquid to both sides of said film at the place where the film is to be stripped from said surface, stripping said film from said surface, and immediately upon stripping passing said film into a bath of said chilling liquid.

3. A method of improving the physical characteristics of thermoplastic film which comprises continuously laying successive portions of a thermoplastic film on a smooth peripheral wall of a continuously rotating heated drum with one side in intimate contact with said wall, maintaining said contact side of said film in intimate contact with said drum until at least said side has softened, applying a chilling liquid to both sides of said film while said film is on the drum at the place where the film is to be stripped from said drum, and stripping said film from said drum.

4. A method of improving the physical characteristics of thermoplastic film which comprises continuously laying successive portions of a thermoplastic film on a smooth peripheral wall of a continuously rotating heated drum with one side in intimate contact with said wall, maintaining said contact side of said film in intimate contact with said drum until at least said side has softened, applying a chilling liquid to both sides of said film while said film is on the drum at the place where the film is to be stripped from said drum, stripping said film from said drum, and immediately upon stripping passing said film into a bath of said chilling liquid.

5. A method of improving the physical characteristics of polyethylene film which comprises disposing a polyethylene film with one side thereof in intimate contact with a smooth surface, said surface being at a temperature within the range of 218° F. and 228° F., maintaining said film on said heated surface for from 2.8 to 7.5 seconds, applying a chilling liquid to both sides of said film at the place where the film is to be stripped from said surface, and stripping said film from said surface.

6. A method of improving the physical characteristics of polyethylene film which comprises disposing a polyethylene film with one side thereof in intimate contact with a smooth surface, said surface being at a temperature within the range of 218° F. and 228° F., maintaining said film on said heated surface for from 2.8 to 7.5 seconds, applying a chilling liquid to both sides of said film at the place where the film is to be stripped from said surface, stripping said film from said surface, and immediately upon stripping passing said film into a bath of said chilling liquid.

7. A method of improving the physical characteristics of polyethylene film which comprises continuously laying successive portions of a polyethylene film on a smooth peripheral wall of a continuously rotating heated drum with one side in intimate contact with said wall, said wall being at a temperature within the range of 218° F. and 228° F., maintaining said contact side in intimate contact with said drum for from 2.8 to 7.5 seconds, applying a chilling liquid to both sides of said film while said film is on the drum at the place where the film is to be stripped from said drum, and stripping said film from said drum.

8. A method of improving the physical characteristics of polyethylene film which comprises continuously laying successive portions of a polyethylene film on a smooth peripheral wall of a continuously rotating heated drum with one side in intimate contact with said wall, said wall being at a temperature within the range of 218° F. and 228° F., maintaining said contact side in intimate contact with said drum for from 2.8 to 7.5 seconds, applying a chilling liquid to both sides of said film while said film is on the drum at the place where the film is to be stripped from said drum, stripping said film from said drum, and immediately upon stripping passing said film into a bath of said chilling liquid.

9. An apparatus for improving the physical characteristics of thermoplastic film which comprises a continuously rotating heated drum having a smooth peripheral wall, means to continuously lay successive sections of a continuous thermoplastic film with one side thereof in intimate contact with said drum, means to strip said film at the lowermost portion of said drum, and means to apply a chilling liquid to both sides of the film on the drum at the stripping position.

10. An apparatus for improving the physical characteristics of thermoplastic film which comprises a continuously rotating heated drum having a smooth peripheral wall, means to continuously lay successive sections of a continuous thermoplastic film with one side thereof in intimate contact with said drum, means to strip said film at the lowermost portion of said drum, and a tank containing a chilling liquid the level of which is substantially tangent to the lowermost portion of said drum.

11. An apparatus for improving the physical characteristics of thermoplastic film which comprises a continuously rotating heated drum having a smooth peripheral wall, means to continuously lay successive sections of a continuous thermoplastic film with one side thereof in intimate contact with said drum, means to strip said film at the lowermost portion of said drum, a tank containing a chilling liquid the level of which is substantially tangent to the lowermost portion of said drum and the uppermost portion of said film stripping means and means to pass said film immediately upon stripping into said chilling liquid.

RUSSELL F. PIERCE.

REFERENCES CITED

The following references are of record in the file of this patent:

UNITED STATES PATENTS

| Number | Name | Date |
|---|---|---|
| 2,140,788 | Cowgill | Dec. 20, 1938 |
| 2,176,153 | Semon | Oct. 17, 1939 |
| 2,219,700 | Perrin | Oct. 29, 1940 |
| 2,431,042 | Ingersoll | Nov. 18, 1947 |